(12) United States Patent
Fischperer

(10) Patent No.: US 6,753,666 B2
(45) Date of Patent: Jun. 22, 2004

(54) APPARATUS FOR OPERATING A MAGNET VEHICLE

(75) Inventor: Rolf Fischperer, Berlin (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/409,522

(22) Filed: Apr. 8, 2003

(65) Prior Publication Data

US 2003/0227269 A1 Dec. 11, 2003

(30) Foreign Application Priority Data

Apr. 10, 2002 (DE) .......................................... 102 16 300
Jun. 19, 2002 (DE) .......................................... 102 27 253

(51) Int. Cl.$^7$ .............................................. B60L 13/00

(52) U.S. Cl. ........................ 318/135; 104/286; 104/294; 310/12

(58) Field of Search ................................ 104/281, 282, 104/284, 287, 290–292, 294; 310/12, 13; 318/38, 135

(56) References Cited

U.S. PATENT DOCUMENTS

| | | | | |
|---|---|---|---|---|
| 4,013,014 A | * | 3/1977 | Holtz .......................... | 104/292 |
| 4,454,457 A | | 6/1984 | Nakamura et al. .......... | 318/135 |
| 4,636,667 A | | 1/1987 | Holzinger et al. ............ | 310/13 |

(List continued on next page.)

FOREIGN PATENT DOCUMENTS

| | | |
|---|---|---|
| DE | 28 06 601 | 8/1979 |
| DE | 29 32 764 A1 | 3/1981 |
| DE | 30 06 382 A1 | 8/1981 |
| DE | 33 03 961 A1 | 8/1983 |
| DE | 39 17 058 C1 | 11/1990 |
| DE | 199 22 441 A1 | 11/2000 |

OTHER PUBLICATIONS

Juergen Meins Energieversorgung des Langstatorantriebs, Elektrotechnische Zeitschrift, Berlin, Germany, Etz Bd. 108 (1987), Helft 9, pp. 378–381, month unknown.

Thyssen Henschel, Neue Verkehrstechnologien Magnetfahrtechnik, Sonderdruck Aus Etz, Bd 108, 1987, Heft 9., PP 1–24, month unknown.

Primary Examiner—Burton S. Mullins
Assistant Examiner—Judson H. Jones
(74) Attorney, Agent, or Firm—Michael J. Striker

(57) ABSTRACT

An apparatus for operating a magnet vehicle, especially a magnetically levitated vehicle. The apparatus includes a long stator linear motor with at least one long stator winding laid along a track and at least one exciter arrangement cooperating with this winding and mounted on the vehicle. The long stator winding is divided into winding sections (5.4, 26.4) following one another, which each have a greater length than the exciter arrangement. At least two section cables serve to supply the winding sections with electric power and switch devices serve to connect the winding sections (5.4, 26.4) sequentially to a section cable each in correspondence with the progression of the vehicle. In accordance with the invention the winding sections (5.4, 26.4) each comprise at least a first and a second winding section part (46a, 46b, 49a, 49b), wherein the first winding section part (46a, 49a) consists of first winding segments (51, 53) electrically conductively connected to one another and the second winding section part (46b, 49b) consists of second winding segments (52, 54) electrically conductively connected to one another. The segments have a smaller length than the exciter arrangement (6) and are so arranged one after the other in the direction of the track in a predetermined sequence that the winding sections (5.4, 26.4) always include in any arbitrary conceptual sector extending along the track and having a length corresponding to that of the exciter arrangement (6) at least a first and a second winding segment (51, 52 or 53, 54).

10 Claims, 7 Drawing Sheets

U.S. PATENT DOCUMENTS

| | | | |
|---|---|---|---|
| 4,665,329 A | 5/1987 | Raschbichler | 310/13 |
| 4,728,382 A | 3/1988 | Raschbichler | 156/264 |
| 5,053,654 A | 10/1991 | Augsburger et al. | 310/12 |
| 5,072,144 A * | 12/1991 | Saito et al. | 310/12 |
| 5,605,100 A * | 2/1997 | Morris et al. | 104/284 |
| 6,087,790 A * | 7/2000 | Fischperer | 318/135 |
| 6,286,434 B1 * | 9/2001 | Fischperer | 104/290 |

* cited by examiner

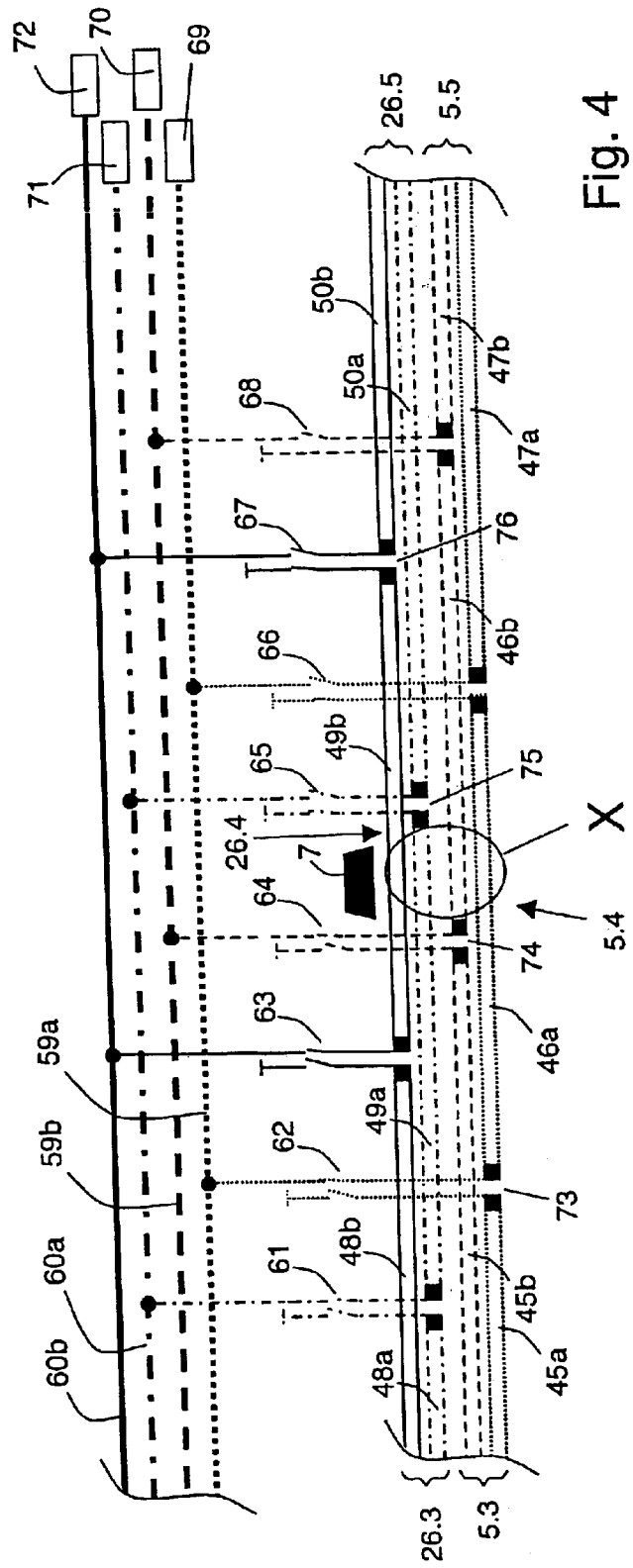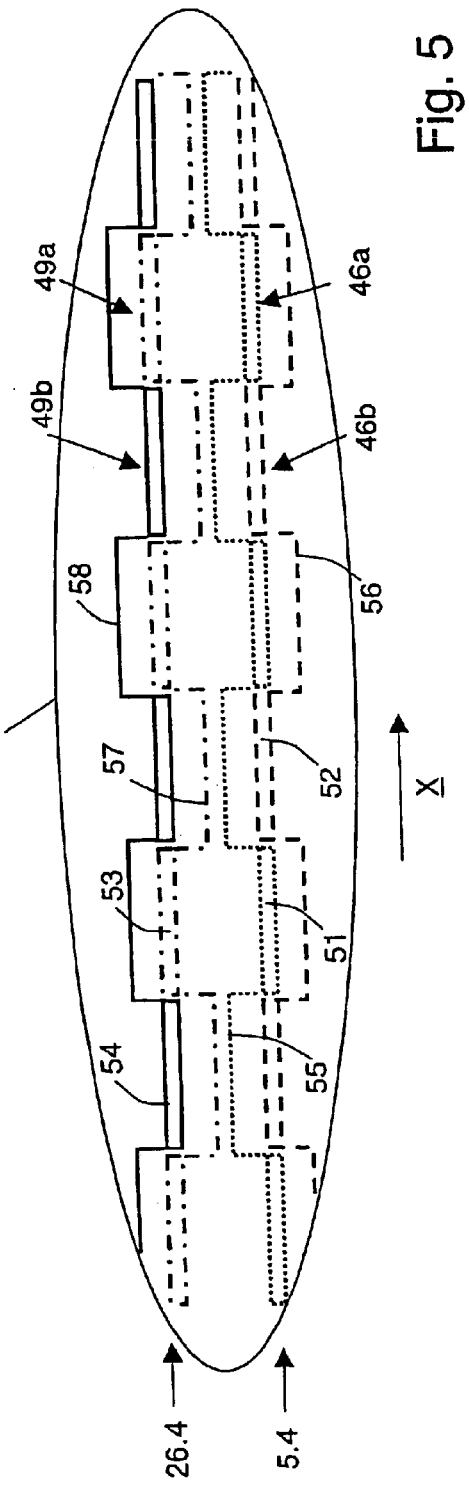

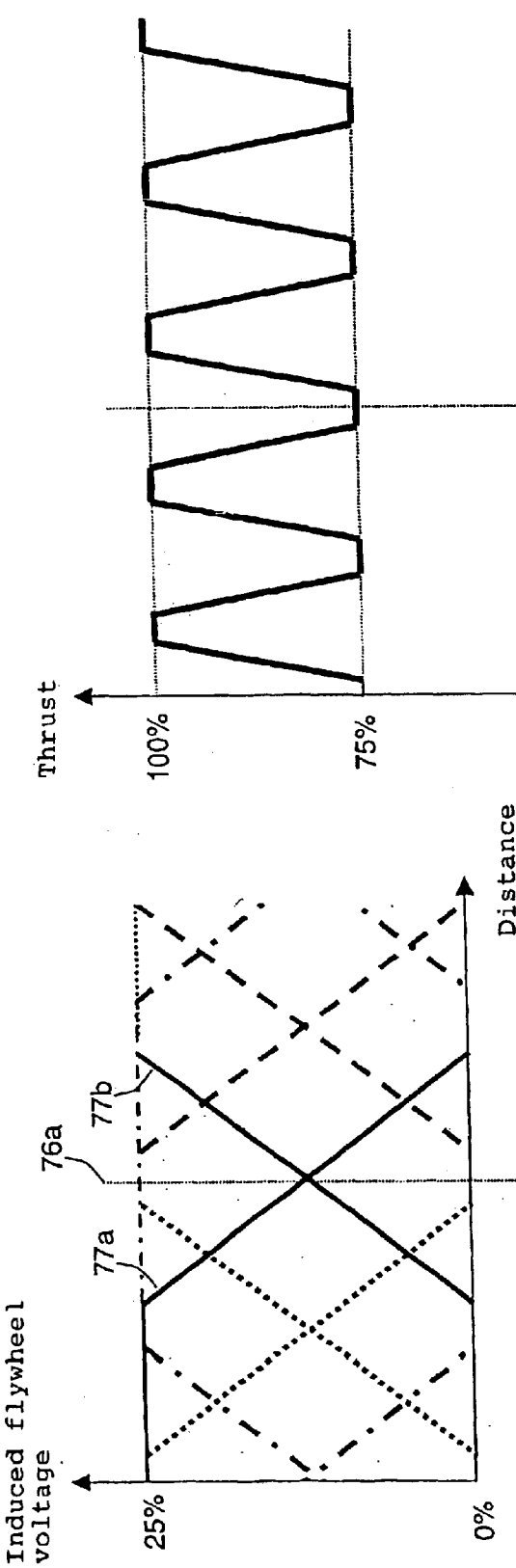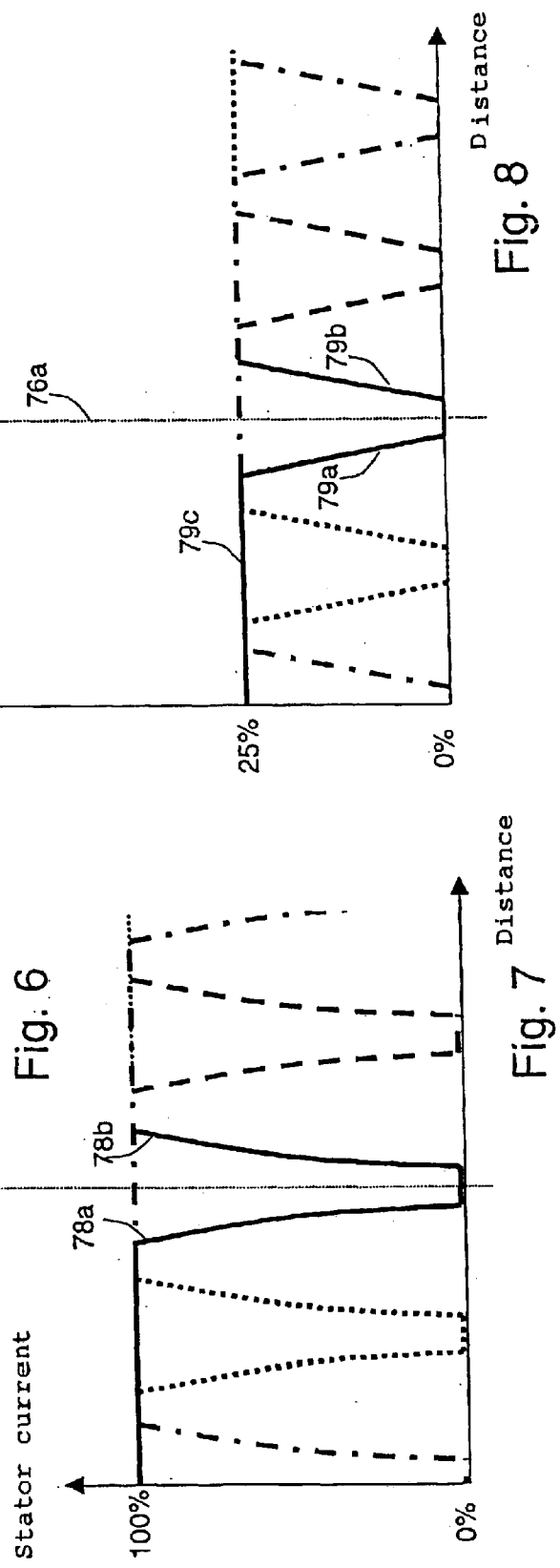

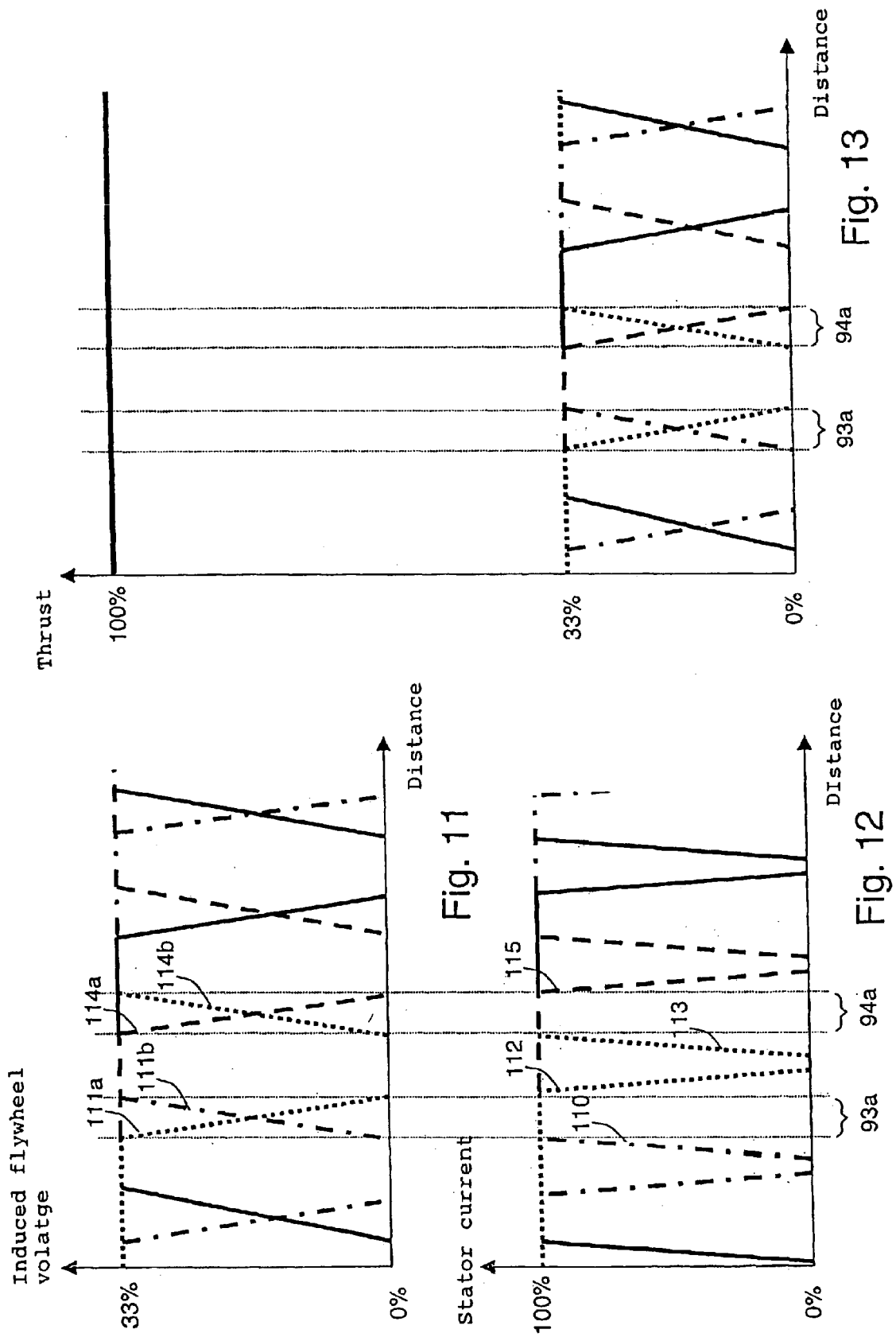

APPARATUS FOR OPERATING A MAGNET VEHICLE

FIELD OF THE INVENTION

This invention relates to an apparatus for operating a magnet vehicle, especially a magnetically levitated vehicle, and including a synchronous long stator linear motor with at least one long stator winding laid along a track and at least one exciter arrangement cooperating with this, extending in the direction of the track and mounted on the vehicle, wherein the long stator winding is divided into winding sections following one another in the direction of the track, separated from one another by changeover points and each having a greater length than the exciter arrangement, at least two section cables associated with the winding sections for supplying the winding sections with electric power and switch devices for sequential connection of the winding sections each to a section cable in correspondence with the progression of the vehicle.

DESCRIPTION OF THE PRIOR ART

Long stator linear motors of the kind here of interest (e.g. U.S. Pat. No. 5,053,654, DE 199 22 441 A1) comprise as the primary part a long stator laid along a given track, with at least one long stator winding (e.g. U.S. Pat. No. 4,665,329, U.S. Pat. No. 4,728,382), in which a travelling electromagnetic field propagating in the direction of movement of the vehicle to be driven is generated. On the other hand an exciter arrangement mounted on the vehicle and mostly extending over its whole length (e.g. DE 34 10 119 A1) serves as the secondary part and is composed of electromagnets serving simultaneously as supporting magnets. The long stator winding is usually divided into a plurality of winding sections, which lie directly after one another in the direction of travel, separated electrically from one another by changeover points and with lengths of 1000 m to 2000 m for example, which are indeed comparatively short but substantially longer than the vehicle of up to 250 m length for example. At least one comparatively long, e.g. about 40 km long section cable is also laid parallel to the track, being connected at one or both ends to a so-called substation, in which the inverters or the like needed to supply the current and voltage of the stator winding are installed. In order to restrict the power consumption and the effective impedance only that winding section in which the vehicle is actually located is supplied with current, in that the individual winding sections are connected individually and one after the other to the track section cable with the aid of switching devices, in accordance with the progress of the vehicle. The switching over operations needed for this are effected according to known methods, which have become known under designations such as, short-circuit, leap-frog, alternate step, three-step methods for example or the like (for example electrotechnical journal etz, vol. 108, 1987, issue 9, pages 378 to 381). As well as this it is also E own to overlap the individual winding sections over part of their length and always to undertake the switching over from one to the other winding section when the vehicle is located in an overlapped region (U.S. Pat. No. 4,454,457).

In operation of such a magnetically levitated vehicle the substations have to supply voltages which are substantially equal to the sum of the voltage induced by the vehicle (synchronous emf or internal voltage), the voltage drop across the corresponding winding section and the voltage drop across the associated part of the section cable. If the voltage drop across the section cable is neglected, there is available to drive the vehicle that current which can be obtained with the part of the voltage supplied by the substation which exceeds the synchronous emf.

The synchronous emf is, especially at high speeds, substantially proportional both to the speed of the vehicle and to the length of the exciter arrangement (vehicle length). Accordingly the voltages supplied by the substations in those track parts in which high speeds are to be achieved must be especially large. This applies all the more as the substations of these track section parts are provided with high step-up transformers at their outputs so that they do supply high voltages but only provide small currents and thus small thrust forces or powers.

As against the comparatively small construction costs along the track there is the problem with these apparatuses that arbitrary increase of the output voltages of the substations is not possible with the currently available long stator windings or their insulations. A consequence of this that the attainable voltage limits lie around 10 kV to 20 kV for example. In conjunction with the normally provided maximum currents of about 1000 A and with vehicles whose exciter arrangements comprise 10 sections with lengths of 25 m each for example, the attainable speeds amount to about 400 km/h at the most. Higher maximum speeds can only be attained with shorter trains while longer trains can only be realised with smaller maximum speeds.

Synchronous long stator linear motors are also known (DE 28 06 601 A1) in which the individual winding sections of the long stator winding have lengths which correspond to a fraction of the length of the exciter arrangements. The winding sections are fed by inverters which are associated with them in fixed position, each with an associated switching device and connected by a common section cable to a DC source. Against the advantage of a more favourable voltage distribution to a plurality of winding sections there is here the disadvantage that a higher outlay in apparatus along the track is necessary on account of the plurality of inverters and switching devices per vehicle length.

SUMMARY OF THE INVENTION

Starting from the above the invention is based on the object of solving the voltage and power problem discussed above.

A further object of this invention is to design the apparatus mentioned above such that higher vehicle speeds can be obtained with the same lengths of the exiciter arrangements and/or longer exciter arrangements and thus longer vehicles with the same vehicle speed.

Yet another object of this invention is to design the apparatus mentioned above such that higher vehicle speeds and/or longer exciter arrangements can be attained even if conventional long stator windings are used and the maximum voltages appearing at the outputs of the substations are not increased.

A further aim of this invention is to achieve the objects mentioned above without increasing the maximum voltages appearing at the outputs of the substations and without a drastic increase in the construction cost.

These and other objects were solved and these and other aims are attained by the present invention by means of an apparatus of the kind specified above which is characterized in that the winding sections each comprise at least a first and a second winding section part, wherein the first winding section part consists of first winding segments connected electrically conductively to each other and wherein the first and second segments have a smaller lengths than the exciter arrangement and are so arranged one after the other in the direction of the track in a predetermined sequence that the winding sections in any arbitrarily conceived sector extending along the track and having a length corresponding to the exciter arrangement always contain in each case at least one first and one second winding segment.

The result of the subdivision of the long stator winding according to the invention is that the voltage induced by the exciter arrangement at any point of the track is distributed over two or more winding section parts, each connectable to a separate substation.

The result of this is that, without increasing the maximum voltage to be applied to a winding section part, there are voltage or power reserves which allow higher speeds and/or greater vehicle lengths. Nevertheless each winding section and each winding section part can have a substantially greater length than the exciter arrangement, so that the number of inverters or the like to be installed along the length of the track remains comparatively small, in spite of the increase in the installed power.

Further advantageous features of the invention appear from the dependent claims.

BRIEF DESCRIPTION OF THE DRAWINGS

The invention is explained in more detail below by embodiments in conjunction with the accompanying drawings, in which:

FIG. 4 shows schematically an apparatus corresponding to FIG. 4 but according to a first embodiment of the invention:

FIG. 5 shows an enlarged detail X of FIG. 4;

FIGS. 6 to 8 show the voltage, current and thrust graphs in the direction of a track when using the apparatus according to FIG. 4 in the region of changeover points;

FIGS. 11 to 13 are representations corresponding to FIGS. 6 to 8 when using the apparatus according to FIG. 9.

Figure 1:
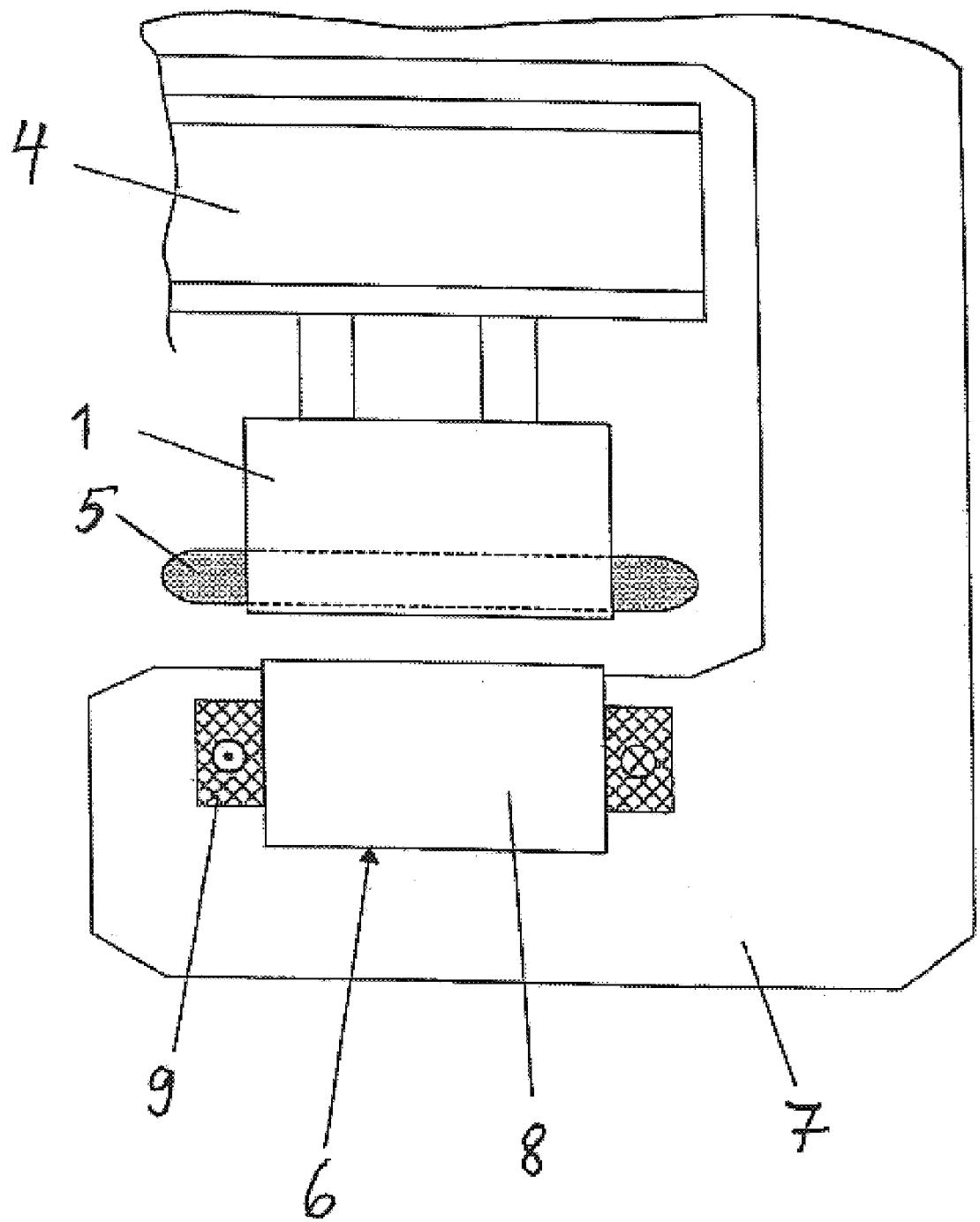
FIG. 1 is a schematic cross-section through a magnetically levitated vehicle and its track.
Figure 2:
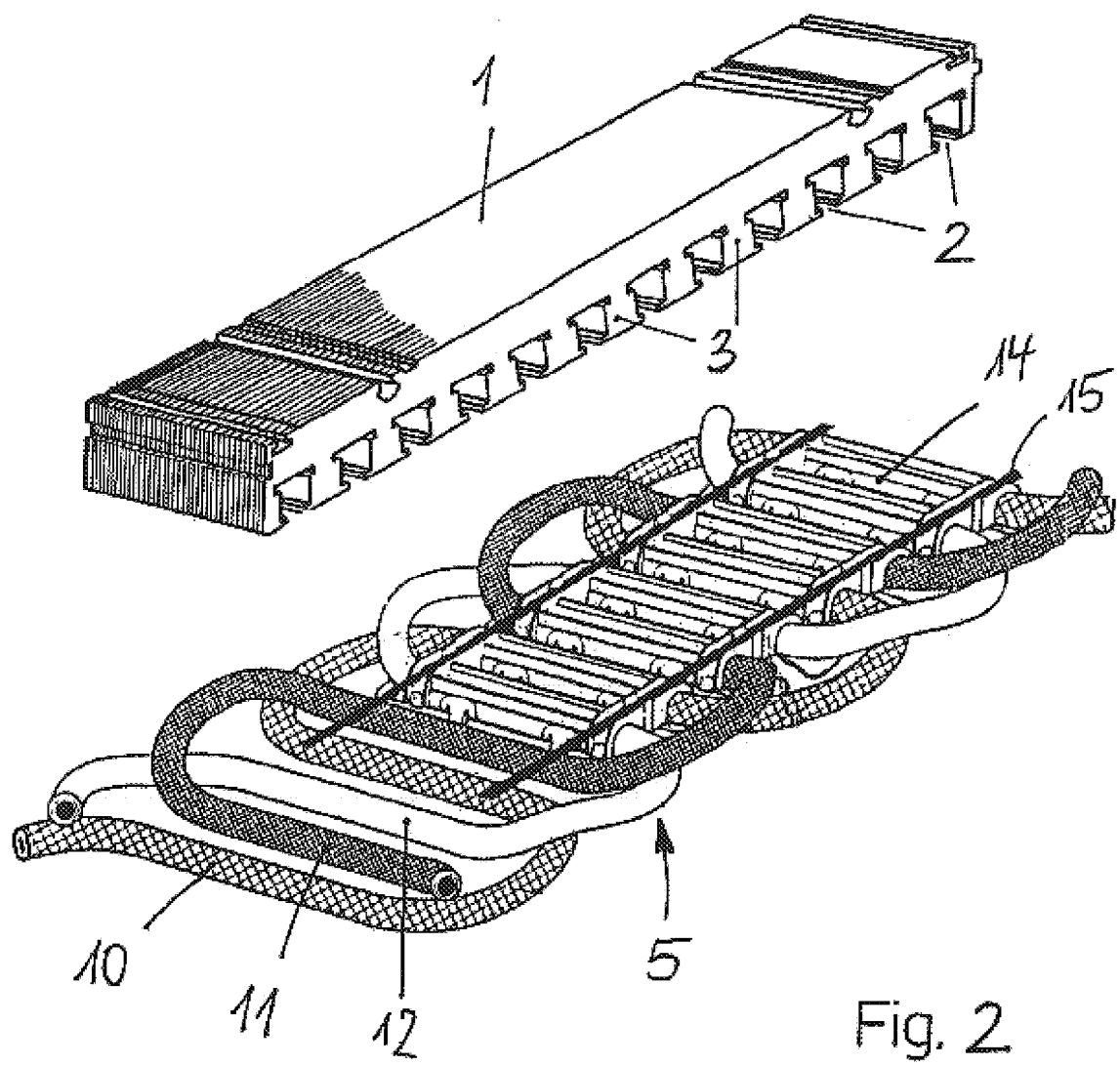
FIG. 2 is a perspective and partially exploded view of an embodiment of the construction of a long stator.

In a magnetically levitated railway with a synchronous long stator linear motor (FIGS. 1 and 2), a stator lamination pack 1, which comprises a plurality of sequentially arranged grooves 2 and teeth 3, is fixed in position on a road 4 erected along a given track. A long stator winding 5 in the form of a three-phase winding is laid in the grooves 2 of the stator lamination pack 1 and is fed from a converter with three-phase current of variable amplitude and frequency, whereby a travelling load current wave is formed in known manner along the long stator linear motor. The exciter field of the long stator linear motor is generated by an exciter arrangement 6, which is formed from a plurality of magnets mounted on a vehicle 7, distributed over its longitudinal direction and simultaneously providing the supporting function, each consisting of a magnet core 8 and an exciter winding 9.

As a rule a stator lamination pack 1 is provided on both sides of the road 4, each with a normally three-phase long stator winding 5 and each with an associated exciter arrangement 6. An embodiment of the structure of such a long stator is shown in particular in FIG. 2, where three individual windings 10, 11 and 12 pertaining to the three phases R, S and T are connected in alternation one after the other or interleaved with each other and which are denoted by different hatchings. It is clear that the straight parts of the individual windings 10, 11 and 12 running parallel to one another come to lie in the assembled state of the long stator each in an associated groove 2 of the stator lamination pack 1, each being held therein by means of a bracket 14 for example. The curved winding heads projecting from the associated grooves 2 can be provided with additional retaining bands 15 consisting of good conducting material and serving for earthing.

Figure 3:
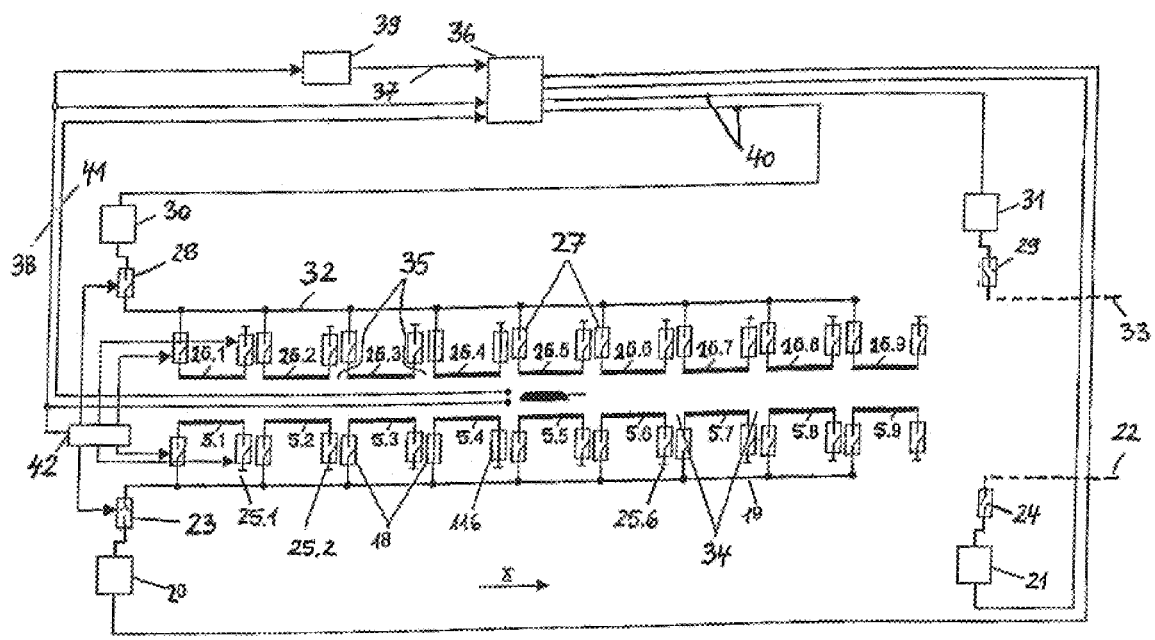
FIG. 3 shows schematically a known apparatus for operating the magnetically levitated vehicle according to FIG. 1.

In order to minimise the demand for reactive power and voltage of the long stator motor, only that portion of the long stator winding 5 which is actually being traversed by the vehicle moving in the direction of the road (arrow x) for example is activated (FIG. 3). To this end the long stator winding 5 is divided into a plurality of winding sections 5.1 to 5.9 which follow directly after one another, as FIG. 3 shows schematically, and which can each be connected by an associated switch device 18 to a section cable 19. This is the current situation in FIG. 3 for the winding section 5.4. In the embodiment one end of the section cable 19 is connected to a converter 20, in which the devices needed to supply the current in the winding sections 5.1 to 5.9 are contained. Further converters 21 are connected to farther section cables 22 following along the road, with which the following windings of the linear motor can be supplied in corresponding manner. The different converters 20, 21 are always activated with the aid of switch devices 23, 24 when the vehicle 7 drives into or drives out of the section of the road defined by a converter 20, 21 or a section cable 19, 22.

In fact the supply apparatus for the long stator winding 5 does not only consist of the feeding switch device 18 but also of switch devices 116 for creating star points (FIG. 3). However this is not necessary to an understanding of the invention.

The winding sections 5.1 to 5.9 shown in FIG. 3 moreover serve mostly to drive only one, e.g. the right side of the vehicle 7. Further winding sections 26.1 to 26.9 of a winding 26, switch devices 27 and 28 or 29, converters 30, 31 and section cables 32, 33 serve in corresponding manner to drive the left side of the vehicle. The winding sections 5.1 to 5.9 are preferably each offset in the x direction relative to the winding sections 26.1 to 26.9 by at least a vehicle length, in order to enable use of the so-called alternate step method. This consists in that the switch devices 18 and 27 are actuated alternately when a changeover point 34 or 35 between two winding sections arranged one after the other is located approximately in the middle of the vehicle.

In order to control the described magnetically levitated railway there serves a speed or current regulator 36, to which a set-point value is applied over a line 37, for the speed of the vehicle 7 currently to be attained or maintained and a current position signal fed over a line 38, being transmitted from the vehicle 7 by radio for example. The set-point values for the speed are entered in a set-point memory 39, to which the position signal is also fed and which issues a speed or current set-point value for the currently traversed winding section.

The current regulator 36 provides set-point values at outputs 40, consisting for example of voltage set-point values and fed to the converters 20, 21, 30 and 31, in order to generate therein The voltages to be applied to the section cables, i.e. in order to feed the required currents to the winding sections for achieving the nominal speed. The speed regulator 36 checks for maintenance of the prescribed nominal speed by means of the actual speed signal determined on the vehicle, which appears in a line 41.

Finally in FIG. 3 a control device 42 is shown, connected to the line 38, by means of which the various switch devices 18, 23, 24, 27, 28 and 29 are so controlled in dependence on the actual position of the vehicle 7 in the x direction that only the currently traversed wielding sections and the corresponding converters are connected to the different section cables.

Apparatuses of the described kind and their function are generally known from the publications DE-OS 29 32 764 A2, DE 30 06 382 C2, DE 33 03 961 A1, DE 39 17 058 A1, U.S. Pat. No. 4,665,329, U.S. Pat. No. 4,728,382 and the offprint from etz, vol. 108, issue 9, pages 1–24 which are accordingly made part of the subject matter of the present disclosure by reference, in order to avoid repetition.

FIG. 4 shows schematically only the winding sections 5.3, 5.4 and 5.5 of the right winding 5 shown in FIG. 3, as well as the associated winding sections 26.3, 26.4 and 26.5 of the left winding 26 shown in FIG. 3. Each of the winding sections 5.3, 5.4, 5.5 etc, comprises a respective first winding section part 45a, 46a and 47a and a second winding section part 45b, 46b and 47b, etc., while each of the winding sections 26.3 to 26.5, etc. correspondingly comprises a first and a second winding section part 48a, 49a, 50a and 48b, 49b and 50b respectively. In order to assist understanding, in FIGS. 4 and 5 the first winding section parts 45a, 46a and 47a on the right stator side are shown in dotted lines and the second winding section parts 45b, 46b and 47b in dashed lines, whereas on the left stator side the first winding section parts 48a, 49a and 50a are shown in chain dotted lines and the second winding section parts 48b, 49b and 50b in solid lines.

According to FIG. 5, each of the winding section parts 46a, 46b, 49a and 49b is divided in the longitudinal direction x of the long stator linear motor into a plurality of winding segments. The first segments of the first winding section part 46a are denoted by the reference number 51, second segments of the winding section part 46b by the reference numeral 52, first segments of the first winding section part 49a by the reference numeral 53 and second segments of the second winding section part 49b by the reference numeral 54. FIG. 5 further shows that the segments 51 are connected electrically conductively together, here in series circuit, by lines 55, the segments 52 by lines 56, the segments 53 by lines 57 and the segments 54 by lines 58. The other winding section parts not shown in FIG. 5 are divided in like manner. Each first winding section part (e.g. 46a) therefore consists of segments (e.g. 51), which lie in selected grooves of the stator lamination pack 1 and are connected together in the region of the grooves 2 which remain free by the lines (e.g. 55), while the second winding section parts (e.g. 46b) consist of segments (e.g. 52), which lie in the grooves 2 left free by the first segments and are connected together in the region of the remaining grooves by further lines (e.g. 56), so that the first and second winding section parts each form respective systems electrically separate from one another.

FIGS. 4 and 5 only show the subdivision according to the invention in a highly schematic manner and for one phase of the polyphase current. In fact the individual winding segments 51 to 54 are disposed as in FIG. 2, in that for example segments 51 and 52 of all three phases are disposed alternately in the grooves 2 of the stator lamination pack 1 of the right stator side and correspondingly segments 53 and 54 of all three phases are disposed alternately in the grooves 2 of the stator lamination pack 1 of the left stator side. However it would alternatively also be possible, as is indicated in FIGS. 4 and 5 by the lengths of the segments 51 to 54 compared with the length of the vehicle 7, i.e. of the exciter arrangement 6 (FIG. 1) of substantially the same length, to lay for example the first segments 51 and 53 of the first winding section parts 46a, 49a one after the other in each two, three or more grooves 2, then leave a corresponding number of grooves 2 free and lay the first segments 51 and 53 of the winding section parts 46a, 49a once again in two, three or more grooves 2. The gaps thus remaining between the segments 51, 53 are then filled with the second segments 52, 54 of the two second winding section parts 46b and 49b, so that in the longitudinal direction x segments 51, 52 and 53, 54 follow one another alternately, having lengths which correspond to an integral multiple of one tooth/groove pitch. However, overall, the individual segments 51 to 54, which are preferably all of the same length, have a length in accordance with the invention which is smaller and preferably substantially smaller than the length of the exciter arrangement 6 of the vehicle 7.

The individual winding section parts 45a and 45b to 50a, 50b can be connected to section cables 59a, 59b and 60a, 60b in the manner shown in FIG. 4, where the section cable 59a is associated with the winding section parts 45a, 46a and 47a, the section cable 59b with the winding section parts 45b, 46b and 47b and correspondingly the sections cables 60a, 60b with the winding section parts 48a, 48b to 50a, 50b. The section cables are therefore represented dotted, dashed, etc. like the corresponding winding section parts. In between the individual winding section parts 45a to 50b and the section cables 59a,b or 60a,b there are connected respective first and second switch devices 61 to 68. The first and second switch devices 62, 66 and 64, 68 respectively correspond to the switching devices 18 according to FIG. 3 and the first and second switching devices 61, 65 and 63, 67 respectively to the switching devices 27 according to FIG. 3, with the difference that two switching devices 62, 64 or 66, 68 and 61, 63 or 65, 67 are present in FIG. 4 for each switching device 18, 27 respectively in FIG. 3, since each winding section 5.1 to 5.9 and 26.1 to 26.9 is divided in FIG. 4 into two winding section parts each (e.g. 45a, 45b). Finally each section cable 59a, b or 60a, b is connected to a converter 69 to 72 individually associated therewith, corresponding to the substations 20, 21 or 30, 31 according to FIG. 3, so that a separate converter is associated with each of the first and second winding section parts.

The individual winding section parts 45a, 45b to 50a, 50b are preferably offset relative to one another in the x direction in the manner shown in FIG. 4, so that changeover points 73 to 76 between the individual winding section parts 45a, b to 50a, b, corresponding to the changeover points 34, 35 according to FIG. 3 are offset relative to each other in the x direction of the track in corresponding manner. This offset is preferably so selected that the spacing of the individual changeover points 73 to 76 from one another is at least equal to the length of the longest exciter arrangement 6 on the vehicle 7.

The switch devices 61 to 68 are switched in sequence with the aid of a control device analogous to the control device 42 according to FIG. 3, in step with the vehicle 7 moving in the x direction, as follows for example:

It will first be assumed that the vehicle 7 is just shortly before the changeover point 75 between the winding section parts 49a and 50a. At this instant the winding section part 49a with its segments 53 is connected to the section cable 60a by means of the switch device 61, while the winding section part 50a is still switched off. Moreover the associated winding section parts 46a, 46b and 49b are connected to the corresponding section cables 59a, 59b and 60b by means of the closed switch devices 62, 64 and 63, so that all four winding section parts 46a, 46b, 49a and 49b are connected to one of the substations 69 to 72 and the vehicle 7 can be driven at maximum power.

On passing the changeover point 75 the winding section part 49a is switched off by opening the switch device 61 and the winding section part 50a is switched on closing the switch device 65, so that the four winding section parts 46a, 46b, 50a and 49b are now connected to the substations 69 to 72. Correspondingly, on reaching the next changeover point 73 in the x direction, between the winding section parts 46a and 47a, the switch device 62 is set to the open state and the switch device 66 to the closed state, so that thereafter the winding section parts 47a, 46b, 50a and 49b are connected to the substations 69 to 72. Analogous switching operations take place at the two next changeover points, so that the same state exists for the winding section parts 47a, 47b, 50a and 50b and the switch devices 65 to 68 as is indicated in FIG. 4 for the winding section parts 46a, 46b, 49a, 49b and the switch devices 61 to 64. The described switching operations repeat along the whole track, whereby a plurality of longitudinal stator windings 5 and 26 can additionally follow after one another, as is indicated in FIG. 3 by the additional section cables 22, 33 and switch devices 24, 29.

In fact the described switch-overs preferably do not take place under load, but as in the known alternate step method with the current supply switched off, as results in FIGS. 6 to 8 for example for the changeover point 76a indicated by a vertical line between the winding section part 48b and 49b of FIG. 4. The lines associated with the various sections cables or winding section parts are shown in FIGS. 6 to 8 dotted, dashed, chain dotted and solid in correspondence with FIGS. 4 and 5.

As FIG. 6 shows, the voltage induced by the vehicle 7 gradually falls off on passing the changeover point 76a, since an ever larger portion of the vehicle 7 leaves the initially solely switched on winding section part 48b, while in the vehicle section which has changed on to the winding section part 49b the voltage induced there increases gradually (lines 77a and 77b). In parallel with this the current fed into the winding section part 48b is gradually reduced to zero value (line 78a), according to FIG. 7, by running down the power of the corresponding converter 72, which means it is turned off shortly before the crossing point of the two lines 77a and 77b, when the vehicle 7 has travelled half-way across the changeover point 76a.

The switch device, not shown in FIG. 4, associated with the winding section part 48b is now switched into the open state and following switch device 63 is switched into the closed state, in order to connect the winding section part 49b to the associated section cable 60b and the converter 72, in place of the winding section part 48b. Thereafter, by turning up the converter 72 the current is increased again to the maximum value (line 78b in FIG. 7). The thrust behaves proportionally to the induced synchronous emf (induction) and proportional to the stator current. Altogether there is therefore a momentary loss of thrust in the region of the changeover point 76a of 25% maximum, as is shown schematically in FIG. 8. Because the spacing from one another of the various changeover points 73 to 76 at any point along the track is greater than the longest exciter arrangement 6 of the vehicle 7, as has been mentioned above, the vehicle 7 can at any place along the track only be in the region of a single changeover point, so that it gets always full thrust power from three winding section parts and the partial thrust power seen in FIG. 8 (below) from the winding section parts adjoining the corresponding changeover point. According to the lower part of FIG. 8 the winding section parts 48b, 49b for example therefore provide a contribution of thrust power decreasing momentarily to the value zero (lines 79a, 79b) whereas they contribute a proportion of 25% outside the changeover point 76a (line 79c). The sum of the thrust powers of all four winding section parts participating thus always lies between 75% and 100% of the maximum thrust which can be obtained with the substations 69 to 72, in accordance with the upper part of FIG. 8.

The invention described with reference to FIGS. 4 to 8 has the substantial advantage that twice the power can be made available with the same length of the winding sections. Since each winding section is composed of two winding section parts, which have the same geometry as the previous winding sections and can therefore be operated at the same voltage limits as these, 2×20 k per stator side for example, instead of only 1×20 kV, can be made effective. Accordingly a substantial increase in the speed of travel and/or of the vehicle length is possible. In relation to the maximum possible stator current there are no restrictions which have to be adopted, since the transformer ratio of the converters does not have to be increased. It is also advantageous that the powers supplied by the two substations per stator side are uniformly distributed over the exciter arrangements 6. This is essentially achieved in that each winding section part is subdivided into many individual winding segments following each other alternately and thus the winding sections in any arbitrary sector conceived along the track which has a length corresponding to one of the exciter devices 6 includes a plurality of first segments 51 or 53 and second segments 52 or 54. Finally it is advantageous that the selected arrangement in the region of the changeover points only leads to a thrust power cuts from 100% to 75% each, while when using the alternate step method with conventional long stator linear motors there is a cut in thrust power of 50%. The increased requirement for converters, i.e. doubling them, can therefore be accepted.

The embodiment of the invention described below with reference to FIGS. 9 to 13 relates to an apparatus in which the two stator sides according to FIG. 3 are always driven simultaneously by only three winding section parts, instead of by four as in FIG. 4. This is essentially achieved in that the provided winding section parts are used together by both stator sides.

Figure 9:
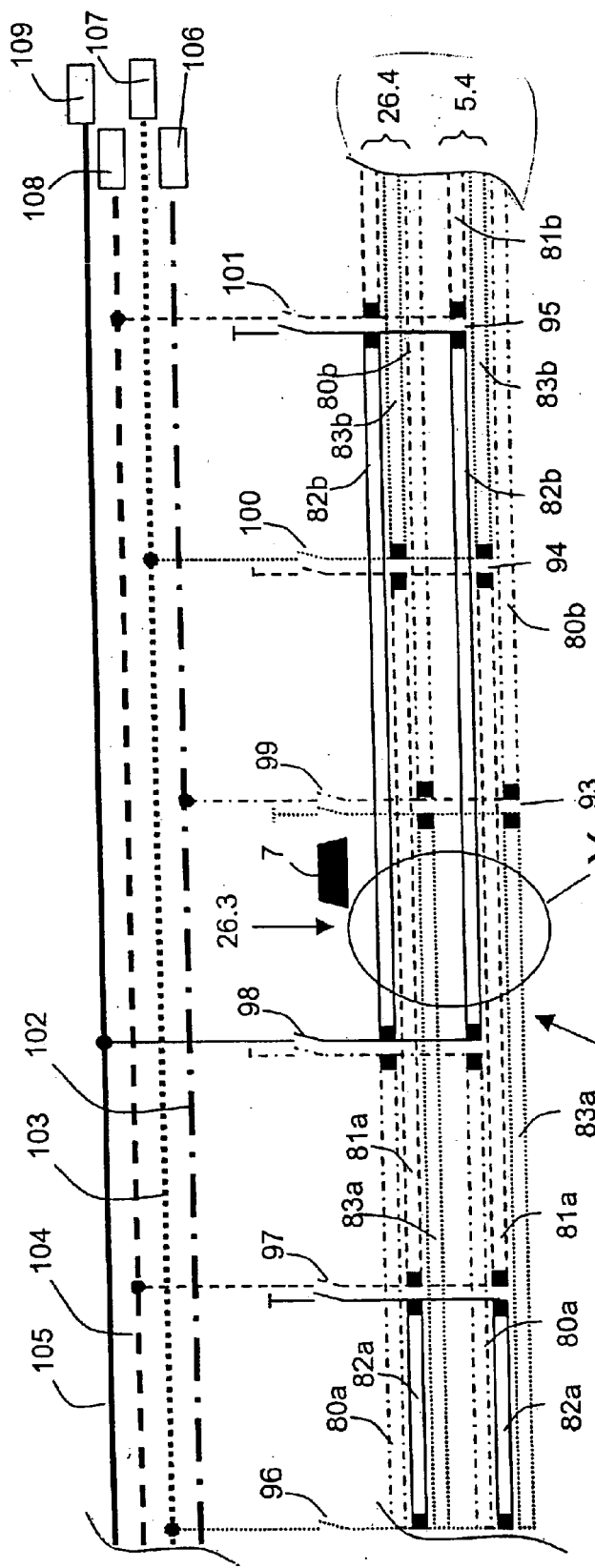
FIG. 9 shows an apparatus according to FIG. 3 but according to a second embodiment of the invention.

FIG. 9 shows two winding sections 5.3 and 5.4 of the right winding 5 and the associated two winding sections 26.3 and 26.4 of the left winding 26 of the long stator linear motor. Each of the right winding sections 5.3 and 5.4 is composed of three winding section parts, 81a, 82b and 83a, and 80b, 81b, 83b respectively and each of the left winding sections 26.3 and 26.4 of the same three winding section parts 81a, 82b, 83a, and 80b, 81b, 83b respectively, while further, corresponding winding section parts (e.g. 80a, 82a, etc.) adjoin to the left, pertaining to further winding sections respectively according to FIG. 3. To assist understanding first winding section parts 80a, 80b are shown in chain dotted lines, second winding section parts 81a, 81b in dashed lines, third winding section parts 82a, 82b in solid lines and fourth winding sections 83a, 83b in dotted lines. It is emphasised thereby that both the right and the left longitudinal stator windings 5 and 26 respectively are composed of the same winding section parts.

Figure 10:
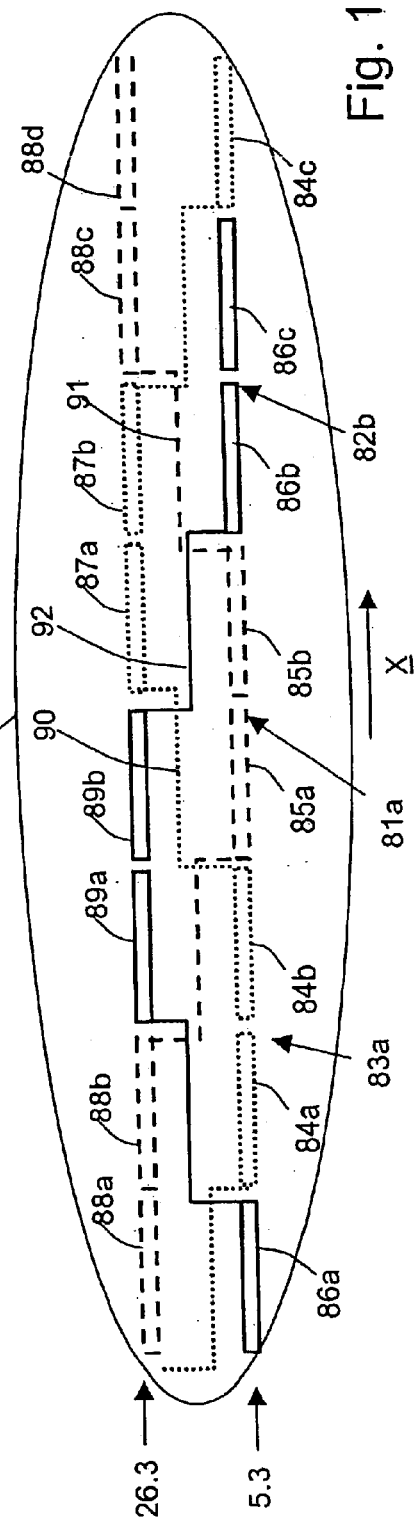
FIG. 10 shows an enlarged detail Y of FIG. 9.

According to FIG. 10, each of the winding section parts 81a, 82b and 83a is divided in the longitudinal direction x into a plurality of winding segments. Parts of the winding section parts 80 are not present at this point. Thus on the right stator side, second segments of the second winding section part 81a are denoted by the reference numerals 85a and 85b, third segments of the third winding section part 82b by the reference numerals 86a, 86b and 86c and fourth segments of the fourth winding section part 83a by the reference numerals 84a, 84b and 84c, while on the left stator side the winding section parts 81a and 82b and 83a correspondingly comprise respectively second and third and fourth segments 88a to 88d, 89a, 89b and 87a, 87b. The winding section parts 80a, 80b, 81b, 82a and 83b, etc. are formed correspondingly, wherein the first winding section parts 80a, 80b are divided into alternating right and left lying first segments.

By analogy with FIG. 5 the segments 84a, 84b and 85a, 85b and 88a, 88b, etc. are electrically connected together by lines, not shown in detail, and are here in series circuit. In contrast to FIG. 5 moreover the segment 84b of the right stator side is electrically connected by a line 90 to the segment 87a of the left side, the segment 85b of the right side by a line 91 electrically to the segment 88c of the left side, the segment 89b of the left side by a line 92 electrically to the segment 86b of the right side, etc. Finally the various segments are so arranged along the track (x direction) that on the right side for example there follow alternately two segments (e.g. 84a, 84b) of the fourth winding section part (e.g. 83a), then two segments (e.g. 85a, 85b) of the second winding section part (e.g. 81a) and thereafter two segments (e.g. 86b, 86c) of the third winding section part (e.g. 82b) and thereafter the same sequence begins afresh (e.g. with the segment 84c). The sequence on the other stator side corresponds (e.g. 88a, 88b, 89a, 89b, 87a, 87b, 88c, 88d). It is, however, to note that there is a gap between segments of the right side (e.g. 84a, 84b) pertaining to each other and the corresponding segments, likewise pertaining to each other, of the left side (e.g. 87a, 87b), said gap being represented in FIG. 10 by connecting lines (e.g. 90) and being filled by segments of the other winding section part (e.g. 85a, 89b).

On the basis of the subdivisions described above, the fourth winding section part 83a consists of the right-hand fourth segments 84a and 84b, the left-hand fourth segments 87a and 87b, the right-hand fourth segment 84c and so on, where all these segments are connected in series. The same applies for the second winding section part 81a (two second segments 88a and 88b on the left, then two second segments 85a and 85b on the right, then again two second segments 88c and 88d on the left, and so on) and for the third winding section part 82b (third segment 86a right and third segment 89a, 89b left and 86b, 86c right, etc.). The three winding section parts 83a, 81a, 82b, etc. therefore form three respective systems electrically separate from one another.

The lengths of the segments 84a to 89b, etc. is, as in the case of FIGS. 4 and 5, preferably substantially smaller than the length of the exciter arrangement 6 mounted on the shortest vehicle 7, while the overall length of each winding section part 80a to 83b, etc. composed of the segments is preferably substantially greater than the length of the longest exciter arrangement 6. All segments and winding section parts are moreover advantageously the same length as each other and, as in FIGS. 4 and 5, offset relative to one another in the x direction by such an amount that changeover points 93, 94 and 95 between the individual winding section parts 83a and 80b or 81a and 83b or 82b and 81b have spacings from one another which are at least equal or slightly greater than the length corresponding to the longest exciter arrangement 6.

The various winding section parts are connected to section cables 102 to 105 in analogous manner to FIG. 4, through first, second, third and fourth switch devices 96 to 101, the cables each being connected to a converter 106 to 109. The arrangement is for example such that a first switch device 99 can connect the first winding section part 80b to the section cable 102 and the converter 106, a second switch device 97 can connect the second winding section part 81a to the section cable 104 and the converter 108, a third switch device 98 can connect the third winding section part 82b to the section cable 105 and the converter 109 and a fourth switch device 96 can connect the fourth winding section part 83a to the section cable 103 and the converter 107, whereupon the sequence of connections repeats cyclically. To assist the understanding both the four different section cables and the four different switch devices connected thereto are shown by chain dotted, dotted, dashed and solid lines respectively in FIG. 9.

The switch devices 96 to 101 can be switched progressively by a control device like the control device 42 according to FIG. 3 in step with the vehicle 7 moving in the x direction, as follows:

The vehicle 7 is for example in the region of the winding section 5.3 and shortly before reaching the changeover point 93 between the winding section parts 83a, 80b is fed by the converters 107, 108 and 109, while the converter 106 is unused. As the vehicle 7 approaches the changeover point 93 between the winding section parts 83a and 80b, the switch device 99 is switched on, in order thus to connect the winding section part 80b to the section cable 102 and the converter 106, while the converter 107 continues to be active. The vehicle 7 is now fed by all converters 106, 107, 108 and 109. As the vehicle 7 leaves the changeover point 93, the converter 107 is turned off by means of the switch device 96. Only the converters 106, 108 and 109 now supply the winding sections 80b, 81a and 82b. On passing the next changeover point 94 between the winding section part 81a and 83b the switch device 97 is correspondingly set to the switched off state and the switch device 100 of the winding section part 83 is set to the switched on state. The converter 107 is thus activated again whereas the converter 108 is deactivated, so that the vehicle 7 is driven with the aid of the converters 106, 107 and 109. In the region of the changeover point 95 between the winding section parts 82b and 81b the converter 108 is switched on and the converter 109 off. The vehicle 7 is now driven by means of the converters 106, 107 and 108. After passing the following changeover point in the x direction, supply by means of the converters 107, 108 and 109 occurs again, etc. so that outside the changeover points one converter, i.e. an associated section cable is unused. This state can be used as is customary in the so-called three state method so that in each case the converter which is unused or in the standby state is used for the required switching operations.

The described changeovers actually take place like in FIGS. 4 and 5 with the current supply switched off, in accordance with FIGS. 11 to 13, in which the various lines are again shown chain-dotted, dotted, etc. In the region of a first changeover point 93a between the winding section parts 83a and 80b marked by vertical lines (FIG. 9) the chain-dotted section cable 102 and the converter 106 therewith are in the standby state. The switch device 99 is set to the closed state shortly before the vehicle 7 runs into the changeover point 93a, whereby the winding section part 80b is connected to the chain—dotted section cable 102, i.e. to the substation 106 (line 110 in FIG. 12), while the winding section part 83a remains connected to the dotted section cable 103 and the converter 107. In consequence the induced synchronous emf gradually falls on passing the changeover point 93a in the region of the winding section part 83a and gradually increases in the region of the winding section part 80b (lines 111a, 111b in FIG. 11). When the vehicle 7 has completely passed the changeover point 93a, the current in the winding section part 83a is reduced to zero and the section cable 103 passes into the standby state (line 112 in FIG. 12). The switch device 96 is then controlled to the open state and the switch device 100 to the closed state, whereby the section cable 103 is now connected to the winding section part 83b, in order to prepare it for the next change of section part (line 113 in FIG. 12). When the vehicle 7 therefore runs into the changeover point denoted by the reference numeral 94a between the winding section parts 81a and 83b (FIG. 9), the synchronous emf's become smaller in the winding section part 81a and correspondingly larger in the winding section part 83b in the same way as in the above description (lines 114a, 114b in FIG. 11), until the changeover point 94a has been completely passed. The converter 108 is then turned down, in order to reduce the current in the winding section part 81a to zero (line 115 in FIG. 12), whereafter the described switching operations repeat in accordance with the progress of the vehicle 7.

In contrast to the embodiment according to FIGS. 4 to 8 both stator sides in the embodiment according to FIGS. 9 to 13 are formed by in all three, instead of four winding section parts 81a, 81a, 82a, etc. However each stator side is here also divided into alternately following winding segments, such that the winding sections on both stator sides include a plurality of first, second and third segments (e.g. 86a, 84a, 84b, 85a, 85b, 86b, 86c, 84c, etc.) in any arbitrary sector envisaged along the track which has a length corresponding to the exciter arrangement 6, which segments pertain to different winding section parts (e.g. 83a, 81a, 82b). Since each winding section part is again operated by a separate converter, the power fed to the vehicle cannot it is true be doubled but it can be increased by half, i.e. from 1×20 kV per stator side to 3×20 kV for the two stator sides. Compared with the embodiment according to FIGS. 4 to 8 only half of the increase in speed or of the vehicle length is possible. However there is a substantial advantage in that, on account of the use of a fourth converter, the three-step method leads to the result that there is no loss of thrust power in the region of the changeover points (FIG. 13).

The method described with reference to FIGS. 9 to 13 requires one additional converter per winding section. If this is not wanted for reasons of cost, one of the section cables, including the associated converter, can even be omitted in the apparatus according to FIG. 9. In this case the switching over in the region of the changeover points would need the aid of the alternate step method for example, so that reductions in the that from 100% to 67% maximum in the available power would occur in the region of each changeover point, analogously to FIGS. 6 to 8.

The length of the described winding segments 51 to 54 (FIG. 5) and 84 to 89 (FIG. 10) is preferably markedly smaller than the length of the longest exciter arrangement 6 provided on the vehicle 7, so that each of the e.g. two or three winding section parts is involved in the propulsion of the vehicle substantially with say the same length. The lengths of the segments can in particular be kept small as to correspond to one tooth/groove pitch according to FIG. 2, in which case the alternately disposed individual windings 10, 11 and 12 in FIG. 2 can correspond to the segments 86a, 84a, 84b, 85a, etc. or 88a, 88b, 89a, 89b, etc. in FIG. 10. The longer a single segment is made the more unfavourable are the conditions which can result, especially when not all winding section parts are participating equally in the drive. Segments of the length of the exciter arrangement 6 would ultimately not enable any increase at all in the speed or vehicle length, so that the upper limit of the length of segments results from the envisaged function.

According to a particularly preferred embodiment of the invention, segments with a length of about 25 m, i.e. with a length are used which corresponds to the length of supports which form the road 4 (FIG. 1) and on which the stator lamination packs 1 are fixed. It is then possible to equip the supports completely with the stator lamination packs 1 and windings 5 (FIG. 2) in the manufacturing plant, to mount the prefabricated supports along the track and then connect the winding section parts together with the aid of the usual sleeves or the like. The lengths of the winding sections 5, 26 can amount as before to about 1000 m to 2000 m for example, or even appreciably more, since the impedance of the winding reduces markedly because the wound part regions per system are markedly shorter in sum than with a continuous winding, in FIG. 4 only 50% and in FIG. 9 effectively 67%.

The invention is not restricted to the described embodiments, which can be modified in many ways. This applies in particular to the number of the winding section parts used per stator side in the specific case. In particular it would be possible to drive the vehicle 7 with only one stator winding and to divide this one winding in accordance with the above description into individual winding sections, which for their part are composed of winding section parts with segments following one another alternately, while in contrast to FIGS. 4 to 8 even more than two winding section parts per winding section can be provided. Furthermore it is possible to connect the various segments of a winding section part at least over part of their length in parallel instead of in series, in that in FIGS. 4 and 5 the lines coming from a switch device (e.g. 62) are not only connected to the one end of an associated winding section part (e.g. 46a) but for example parallel with the segements (e.g. 51) thereof which in this case are electrically separated. It is further possible to form all three phases of a three-phase system in the manner shown in FIGS. 4 to 13 and to so interleave the segments pertaining to the three phases that, between the segments of one phase, the segments of both the other phases come to lie in each case. Furthermore subdivisions other than those apparent from FIGS. 5 and 10 can be effected. This applies especially for the embodiment according to FIGS. 9 and 10. For example all segments of a winding section part (e.g. 83a or 81a, respectively) can here be arranged only on an associated stator side, while the segments of the third winding section part (e.g. 82b) would lie like in FIG. 10 partly on one and partly on the other stator side. Finally it is evident that the various features can also be used in other than the illustrated and described combinations.

It will be understood that each of the elements described above, or two or more together, may also find a useful application in other types of constructions differing from the types described above.

While the invention has been illustrated and described as embodied in a magnetic leviation (maglev) system and an operating method and apparatus therefor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint or prior art, fairly constitute essential characteristics of the generic or specific aspects of this invention.

What is claimed is:

1. Apparatus for operating a magnet vehicle (7), especially a magnetically levitated vehicle, comprising: a synchronous long stator linear motor having at least one long stator winding (5, 26) laid along a track, said long stator winding (5, 26) being divided into winding sections (5.1 to 5.9, 26.1 to 26.9) following one another in a direction of said track, at least one exciter arrangement (6) cooperating with said winding (5, 26), extending in said direction of said track and being mounted on said vehicle (7), said winding sections each having a greater length than said exciter arrangement (6), changeover points (73 to 76 or 93 to 95) separating said winding sections from each other, at least two section cables (59a to 60b, 102 to 105) associated with said winding sections (5.1 to 5.9, 26.1 to 26.9) for supplying the winding sections (5.1 to 5.9, 26.1 to 26.9) with electric power, and switch devices (61 to 68, 96 to 101) for sequential connection of said winding sections (5.1 to 5.9, 26.1 to 26.9) to one of said section cables (59a to 60b, 102 to 105) in correspondence with the progression of the vehicle (7) in said direction, wherein said winding sections (5.1 to 5.9, 26.1 to 26.9) each comprise at least a first and a second winding section part (45a to 50b), wherein said first winding section part (45a, 46a, 47a or 48a, 49a, 50a) consists of first winding segments (51 and 53) connected electrically conductively to each other and said second winding section part (45b, 46b, 47b or 48b, 49b, 50b) consists of second winding segments (52 to 54) connected electrically conductively to each other and wherein said first and second segments (51 to 54) have a smaller length than said exciter arrangement (6) and are so arranged one after the other in said direction of said track in a predetermined sequence that said winding sections (5.1 to 5.9, 26.1 to 26.9) in any arbitrarily conceived sector extending along said track and having a length corresponding to said exciter arrangement (6) contain at least one of said first and one of said second winding segments (51, 52 or 53, 54).

2. Apparatus according to claim 1, wherein first switch devices (62, 66 or 61, 65) are provided for connection of said first winding section parts (46a, 47a or 49a, 50a) to a first section cable (59a or 60a) and second switch devices (64, 68 or 63, 67) are provided for connection of said second winding section parts (46b, 47b or 49b, 50b) to a second section cable (59b or 60b).

3. Apparatus according to claim 2, wherein said first and second winding section parts (45a to 50a and 45b to 50b) are separated from one another along said track by changeover points (73 to 76) which have distances from one another which are greater than corresponds to a length of said exciter arrangement (6).

4. Apparatus according to claim 2 or 3 for operating vehicles (7) with at least two exciter arrangements (6) arranged beside one another in said track direction and further comprising for each of said at least two exciter arrangements (6) a first and a second winding section part (45a to 50a and 45b to 50b) having first and second winding segments (51, 53 and 52, 54), section cables (59a, 60a and 59b, 60b) associated with said first and second winding segments and first and second switch devices (73 to 76) for connection of said winding section parts (45a to 50b) to said section cables.

5. Apparatus according to claim 4, wherein all first and second winding section parts (45a to 50b) are separated from one another by changeover points (73 to 76) whose spacings are greater than a length of a longest exciter arrangement (6) mounted on said vehicle (7).

6. Apparatus according to claim 1, wherein said long stator linear motor is arranged for operating vehicles (7) with at least two exciter arrangements (6) arranged beside one another in said track direction and comprises at least two long stator windings (5, 26) laid alongside one another and, each being associated with one of said exciter arrangements (6), said windings being divided in said direction of said track into winding sections (5.1 to 5.9, 26.1 to 26.9) following one another and each having a greater length than said associated exciter arrangement (6), and wherein at least first, second and third winding section parts (80a to 83b) are provided and consist of first, second and third winding segments (84a to 89b) connected electrically conductively together, having lengths smaller that said associated exciter arrangements (6) and being so arranged in said direction of said track one after the other and alongside one another in a region of said existing winding sections (5.1 to 5.9, 26.1 to 26.9) in a predetermined sequence such that, in arbitrary sectors conceived along said track having a length corresponding to said associated exciter arrangement (6), said winding sections always comprise winding segments from at least two different winding section parts.

7. Apparatus according to claim 6, wherein said winding sections (5.1 to 5.9, 26.1 to 26.9) in said sectors comprise at least a first, second and third segment (e.g. 84a, 85a, 86a or 88a, 89a, 87a) of a first, second and third winding section part (e.g. 83a, 81a, 82b).

8. Apparatus according to claim 7 and further comprising at least three section cables (102 to 105) and switch devices (96 to 101) adapted for connection of said winding section parts (80a to 83b) to said section cables.

9. Apparatus according to claim 7, and flier comprising four section cables (102 to 105) and switch devices (96 to 101) for connecting said winding section parts (80a to 82b) to said section cables in such a manner that at any place along said track one of said section cables (102 to 105) and a converter (106 to 109) connected thereto are in a standby state.

10. Apparatus according to any of claims 6, 7, 8 or 9, wherein said fist, second and third winding section parts (80a to 83b) are separated along said track by changeover points (93 to 95) which have distances from one another which are greater than corresponds to a length of said longest exciter arrangement (6).

* * * * *

UNITED STATES PATENT AND TRADEMARK OFFICE
CERTIFICATE OF CORRECTION

PATENT NO. : 6,753,666 B2            Page 1 of 1
APPLICATION NO. : 10/409522
DATED : June 22, 2004
INVENTOR(S) : R. Fischperer It is certified that error appears in the above-identified patent and that said Letters Patent is hereby corrected as shown below:

DELETE ASSIGNEE AT SEC. 73 "ROBERT BOSCH GMBH, STUTTGART (DE)" AND SUBSTITUTE --TRANSRAPID INTERNATIONAL GMBH & CO. KG, BERLIN (DE)--

Signed and Sealed this

Fifteenth Day of January, 2008

JON W. DUDAS
*Director of the United States Patent and Trademark Office*

UNITED STATES PATENT AND TRADEMARK OFFICE
CERTIFICATE OF CORRECTION

PATENT NO. : 6,753,666 B2
APPLICATION NO. : 10/409522
DATED : June 22, 2004
INVENTOR(S) : R. Fischperer It is certified that error appears in the above-identified patent and that said Letters Patent is hereby corrected as shown below:

On the title page, item [73]
DELETE ASSIGNEE "ROBERT BOSCH GMBH, STUTTGART (DE)" AND SUBSTITUTE --TRANSRAPID INTERNATIONAL GMBH & CO. KG, BERLIN (DE)--

Signed and Sealed this

Twenty-second Day of January, 2008

JON W. DUDAS
*Director of the United States Patent and Trademark Office*